(12) United States Patent
Piccardi (10) Patent No.: US 10,468,979 B2
(45) Date of Patent: Nov. 5, 2019

(54) ELECTRONIC DEVICE WITH A CHARGE RECYCLING MECHANISM

(71) Applicant: Micron Technology, Inc., Boise, ID (US)

(72) Inventor: Michele Piccardi, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/416,699

(22) Filed: May 20, 2019

(65) Prior Publication Data

US 2019/0273432 A1 Sep. 5, 2019

Related U.S. Application Data

(63) Continuation of application No. 15/849,098, filed on Dec. 20, 2017, now Pat. No. 10,348,192.

(51) Int. Cl.
 *H02M 3/07* (2006.01)
(52) U.S. Cl.
 CPC ............. *H02M 3/07* (2013.01); *H02M 3/073* (2013.01); *H02M 2003/076* (2013.01)
(58) Field of Classification Search
 CPC .. H02M 3/07; H02M 2003/073; H02M 3/076; H02M 3/073
 See application file for complete search history.

(56) References Cited

U.S. PATENT DOCUMENTS

| | | | |
|---|---|---|---|
| 4,311,923 A | 1/1982 | Luescher et al. | |
| 5,043,858 A | 8/1991 | Watanabe | |
| 5,381,051 A | 1/1995 | Morton | |
| 5,493,486 A | 2/1996 | Connell et al. | |
| 5,818,289 A | 10/1998 | Chevallier et al. | |
| 5,936,459 A | 8/1999 | Hamamoto | |
| 6,008,690 A * | 12/1999 | Takeshima | H02M 3/073 327/534 |
| 6,046,626 A | 4/2000 | Saeki et al. | |
| 6,154,088 A * | 11/2000 | Chevallier | H02M 3/073 327/331 |

(Continued)

OTHER PUBLICATIONS

Favrat, P. et al., "A New High Efficiency CMOS Voltage Doubler", Proceedings of the IEEE 1997 Custom Integrated Circuits Conference, (1997), p. 259-262.

(Continued)

*Primary Examiner* — Thomas J. Hiltunen
(74) *Attorney, Agent, or Firm* — Perkins Coie LLP (57) ABSTRACT

An electronic device includes: a clock booster including a doubler capacitor, the clock booster configured to precharge the doubler capacitor to store a boosted intermediate voltage greater than an input voltage; a secondary booster including a booster capacitor, the secondary booster configured to use charges stored on the doubler capacitor to generate a stage output greater than the boosted intermediate voltage; and a connecting switch connected to the clock booster and the secondary booster, the connecting switch configured to electrically connect the doubler capacitor and the booster capacitor during a recycling duration for discharging a recycled charge from the booster capacitor to the doubler capacitor through the connecting switch, wherein the recycling duration is after generating the stage output.

25 Claims, 7 Drawing Sheets

(56) References Cited

U.S. PATENT DOCUMENTS

| | | | |
|---|---|---|---|
| 6,359,798 B1* | 3/2002 | Han | H02M 3/073 327/536 |
| 6,545,529 B2 | 4/2003 | Kim | |
| 6,806,761 B1 | 10/2004 | Aude | |
| 7,116,154 B2 | 10/2006 | Guo | |
| 7,239,193 B2 | 7/2007 | Fukuda | |
| 7,439,793 B2* | 10/2008 | Lee | H02M 3/073 327/536 |
| 7,576,523 B2 | 8/2009 | Ogawa et al. | |
| 7,602,233 B2 | 10/2009 | Pietri et al. | |
| 7,652,522 B2 | 1/2010 | Racape | |
| 7,994,844 B2 | 8/2011 | Chen et al. | |
| 8,026,755 B2 | 9/2011 | Ni et al. | |
| 9,502,972 B1 | 11/2016 | Michal et al. | |
| 9,787,176 B2* | 10/2017 | Dong | H02M 3/07 |
| 9,793,794 B2 | 10/2017 | Stauth et al. | |
| 10,211,724 B1 | 2/2019 | Piccardi | |
| 10,211,725 B1* | 2/2019 | Piccardi | H02M 3/07 |
| 10,312,803 B1* | 6/2019 | Piccardi | H02M 3/07 |
| 2006/0290411 A1 | 12/2006 | Smith et al. | |
| 2007/0035973 A1 | 2/2007 | Kitazaki et al. | |
| 2008/0012627 A1 | 1/2008 | Kato | |
| 2008/0122506 A1 | 5/2008 | Racape | |
| 2009/0108915 A1 | 4/2009 | Liao | |
| 2009/0121780 A1 | 5/2009 | Chen et al. | |
| 2009/0174441 A1 | 7/2009 | Gebara et al. | |
| 2013/0113546 A1 | 5/2013 | Shay et al. | |
| 2013/0222050 A1 | 8/2013 | Siao | |
| 2015/0015323 A1 | 1/2015 | Rahman et al. | |
| 2016/0268893 A1 | 9/2016 | Dong et al. | |
| 2017/0317584 A1 | 11/2017 | Tanikawa | |
| 2018/0191243 A1 | 7/2018 | Shay et al. | |

OTHER PUBLICATIONS

U.S. Appl. No. 15/849,137—Unpublished patent application by Michele Piccardi, titled "Electronic Device With a Charging Mechanism", filed Dec. 20, 2017, 32 pages.

* cited by examiner

ELECTRONIC DEVICE WITH A CHARGE RECYCLING MECHANISM

CROSS-REFERENCE TO RELATED APPLICATIONS

This application is a continuation of U.S. patent application Ser. No. 15/849,098, filed Dec. 20, 2017, which is incorporated herein by reference in its entirety.

This application contains subject matter related to an U.S. Patent Application by Michele Piccardi titled "ELECTRONIC DEVICE WITH AN OUTPUT VOLTAGE BOOSTER MECHANISM." The related application is assigned to Micron Technology, Inc., and is identified as U.S. patent application Ser. No. 15/849,052, filed Dec. 20, 2017, now issued as U.S. Pat. No. 10,211,724. The subject matter thereof is incorporated herein by reference thereto.

This application contains subject matter related to an U.S. Patent Application by Michele Piccardi titled "ELECTRONIC DEVICE WITH A CHARGING MECHANISM." The related application is assigned to Micron Technology, Inc., and is identified as U.S. patent application Ser. No. 15/849,137, filed Dec. 20, 2017. The subject matter thereof is incorporated herein by reference thereto.

TECHNICAL FIELD

The disclosed embodiments relate to electronic devices, and, in particular, to semiconductor devices with a charge recycling mechanism.

BACKGROUND

Electronic devices, such as semiconductor devices, memory chips, microprocessor chips, and imager chips, can include a charge pump (e.g., a DC to DC converter that functions as a power source) to create a voltage that is different (e.g., higher or lower) than the available source voltage (e.g., '$V_{dd}$'). Charge pumps can include components (e.g., diodes, switches, comparators, capacitors, resistors, or a combination thereof) that are organized to provide an output voltage that is boosted or reduced from an incoming source voltage.

Figure 1A:
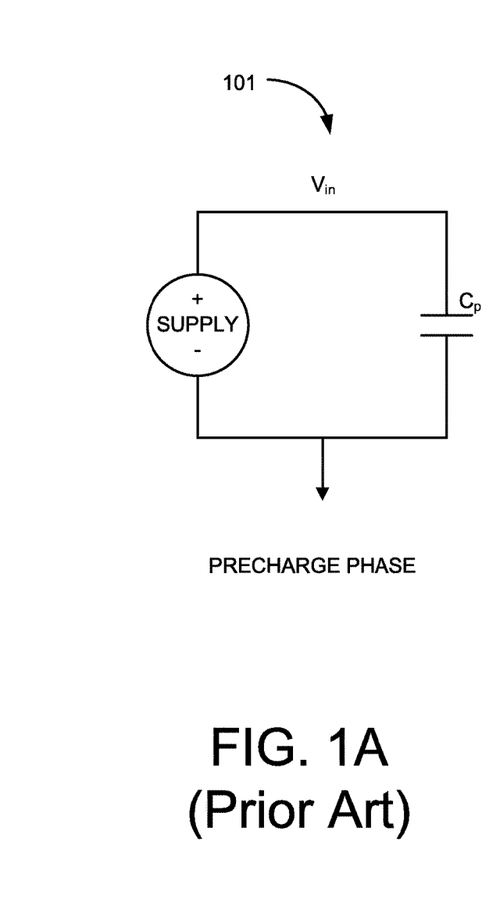
FIGS. 1A-C are block diagrams of an electronic device including a charging mechanism.
Figure 1B:
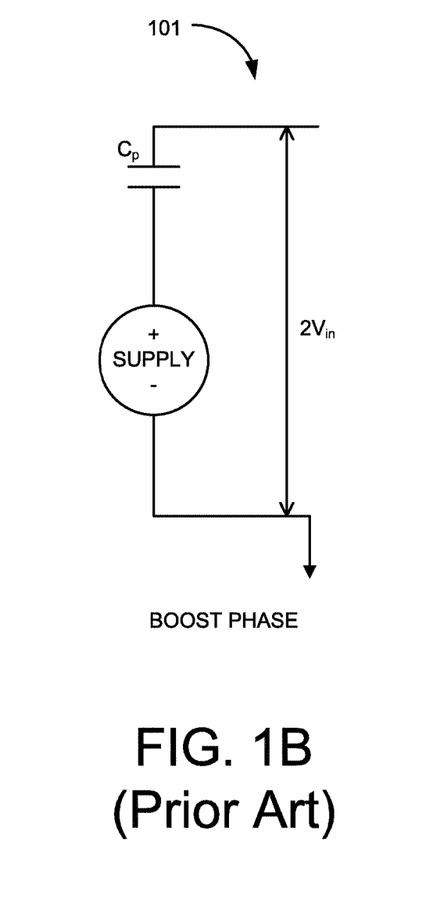

Some charge pumps can include the components arranged in units or stages (e.g., such that the connections between or relative arrangements of the units can be reconfigured to adjust one or more capabilities of the charge pump). FIG. 1A, illustrates a single stage of a charge pump in an electronic device 101. In a pre-charge phase, an energy storage structure (e.g., one or more capacitors, represented as '$C_p$') in the single stage can be charged using an incoming voltage (e.g., '$V_{in}$'). As illustrated in FIG. 1B, the charged storage structure can be reconfigured (e.g., using one or more relays or switches) from a parallel connection with the voltage supply for the pre-charge phase to a series connection with the voltage supply for a boost phase. Accordingly, a resulting output (e.g., '$V_{out}$') can be higher (e.g., than the incoming voltage level (e.g. '$V_{in}$').

Figure 1C:
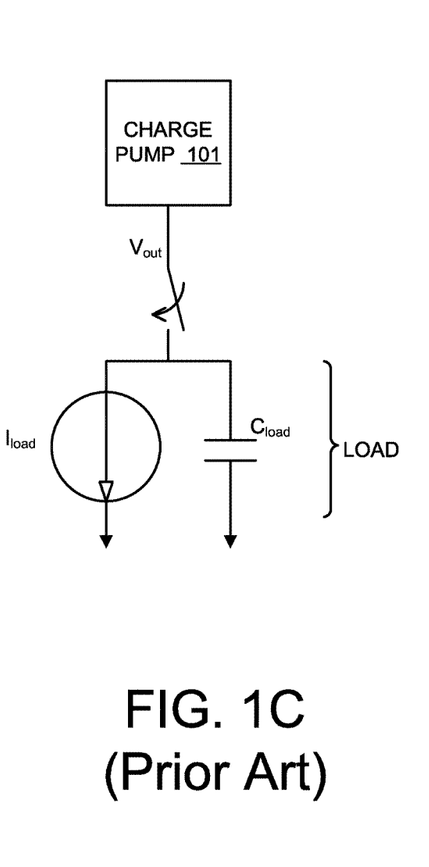

The output voltage can be used to drive a load as illustrated in FIG. 1C. The boosted output can be connected to the electrical load. The load can draw a current (e.g., as represented '$I_{load}$') and/or a drive a load capacitance (e.g., as represented by a capacitance '$C_{load}$'). As such, when the load is connected to the charge pump, the output voltage (e.g., '$V_{out}$') can drop according to the pump capability. In providing the output voltage, charges stored on one or more energy storage structures (e.g., precharging capacitors) can be routed to ground during charging cycles and then recharge from zero voltage.

DETAILED DESCRIPTION

The technology disclosed herein relates to electronic devices (e.g., semiconductor-level devices, sets of analog circuitry components, etc.), systems with electronic devices, and related methods for operating electronic devices in association with charge pumps and/or voltage booster mechanism (e.g., double boosted charge pumps) therein. The electronic devices can include in each stage a clock booster (e.g., a 2-phase NMOS clock doubler) for initially boosting an input voltage, a switching module for routing the initially boosted voltage, and a secondary booster for further boosting the input voltage using the initially boosted voltage. The electronic devices can operate the circuitry therein to recycle charges stored in the secondary booster and use it to precharge in the clock booster instead of discharging the charges to ground. The electronic devices can use a recycling duration to leave the secondary booster connected to the clock booster instead of isolating the circuits and connecting the secondary booster to ground for discharge. The charges stored in the secondary booster can flow into the clock booster and contribute to the precharging operation.

Figure 2:
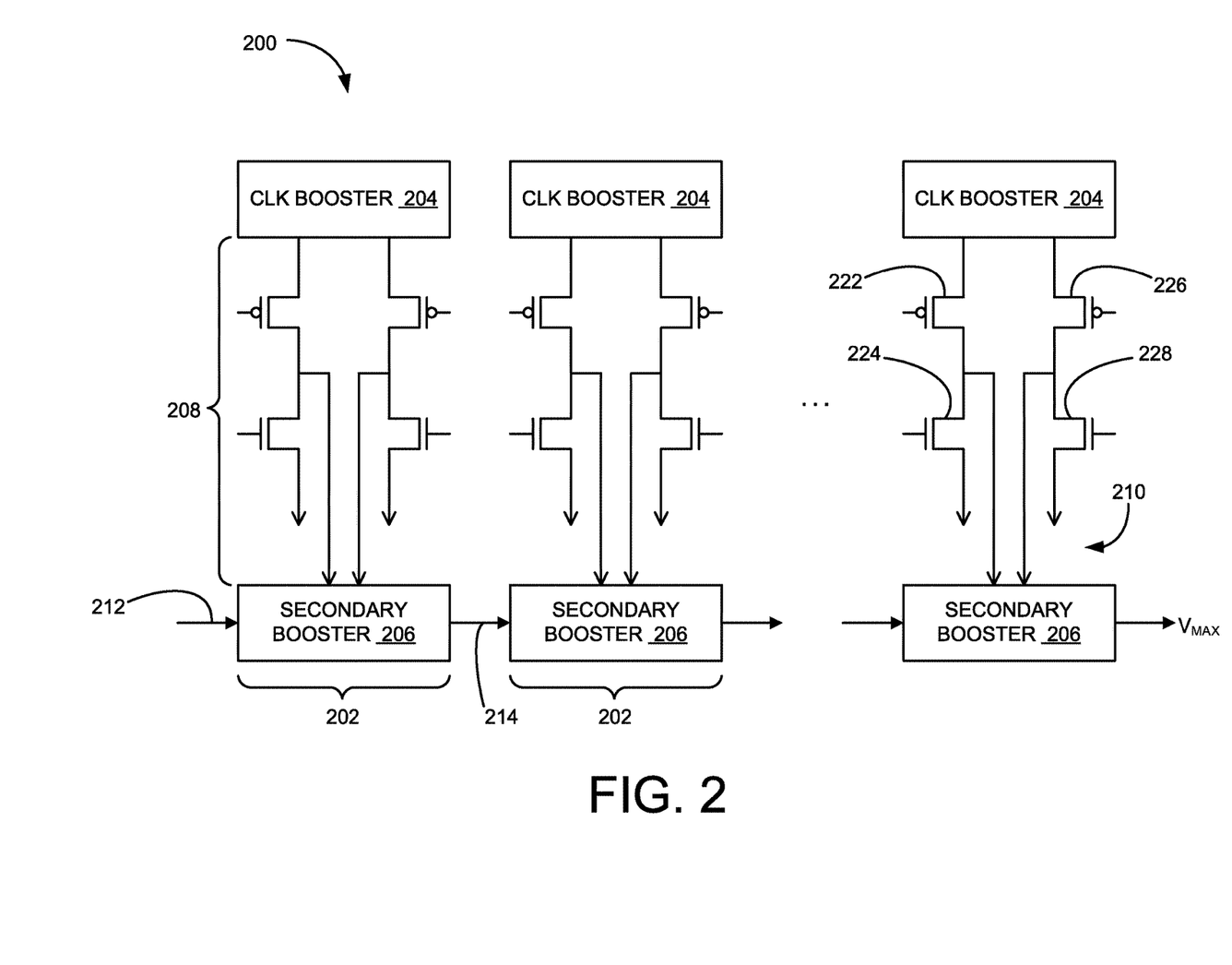
FIG. 2 is a block diagram of an electronic device including a charge recycling mechanism in accordance with an embodiment of the present technology.

FIG. 2 is a block diagram of an electronic device 200 (e.g., a multi-stage charge pump) including a charge recycling mechanism in accordance with an embodiment of the present technology. The electronic device 200 (e.g., a semiconductor device, an integrated circuit, a wafer or silicon level device, a set of digital and/or analog circuitry, etc.) can include a charge pump (e.g., a DC to DC converter, including one or more capacitors to store energy, that functions as a power source using various different internal configurations, arrangements, or electrical connections to provide an output voltage ("$V_{out}$")). The charge pump can include multiple charging stages 202 (e.g., units of circuits, devices, components, etc. configured to produce a voltage greater than the input) connected in series.

Each of the charging stages 202 (e.g., each a double boosted charge pump) can include a clock booster 204 (e.g., an output booster, such as a clock doubler), a secondary booster 206 (e.g., a higher voltage booster circuit, such as a Favrat booster), and a switching module 208 (e.g., a system or a set of switches and electrical connections). The clock booster 204 can be electrically coupled to the secondary booster 206 through the switching module 208. For example, a boosted intermediate voltage 210 (e.g., an intermediate voltage, such as '$2V_{dd}$', that is greater than and/or boosted from a source input voltage, such as '$V_{dd}$') from the clock booster 204 can be routed through the switching module 208 and provided as an input at the secondary booster 206. The secondary booster 206 can use the boosted intermediate voltage 210 from the clock booster 204 to further increase a previous stage input voltage 212 (e.g., '$V_{dd}$' for the first stage or a stage output voltage 214 from a preceding secondary booster for subsequent stages). The stage output voltage 214 resulting from boosting the stage input voltage can be provided as an input voltage to the subsequent stage (e.g., as the stage input to subsequent instance of the secondary booster or as an output to the load).

In some embodiments, the switching module 208 can include multiple switching paths including one or more switches (e.g., parallel paths each including one or more NMOS transistor), one or more complementary switches (e.g., one or more PMOS transistors), or a combination thereof. For example, the switching module 208 can include a first PMOS transistor 222 connected to the clock booster 204 on one end and a first NMOS transistor 224, the secondary booster 206, or a combination thereof on an opposing end. The switching module 208 can further include a second PMOS transistor 226 connected to the clock booster 204 on one end and a second NMOS transistor 228, the secondary booster 206, or a combination thereof on an opposing end.

The charging stages 202 including the clock booster 204 and the switching module 208 (e.g., for providing a voltage greater than the input voltage, such as '$2V_{dd}$') with the secondary booster 206 to provide increased charging efficiency. In comparison to the traditional switch pumps, the charge pump illustrated in FIG. 2 can reduce (e.g., by a factor such as 1.1 or greater, including 2.0 or more) the number of stages (i.e., represented as 'N') necessary to produce the same target voltage and the corresponding resistance. For example, the maximum voltage and the corresponding resistance value of the electronic device 200 can be represented as:

$$V_{max} = V_{dd} + \frac{N}{2} \cdot 2V_{dd}. \quad \text{Equation (1)}$$

$$R_{out} = N/2(f_{clk} \cdot C_p). \quad \text{Equation (2)}$$

Figure 3:
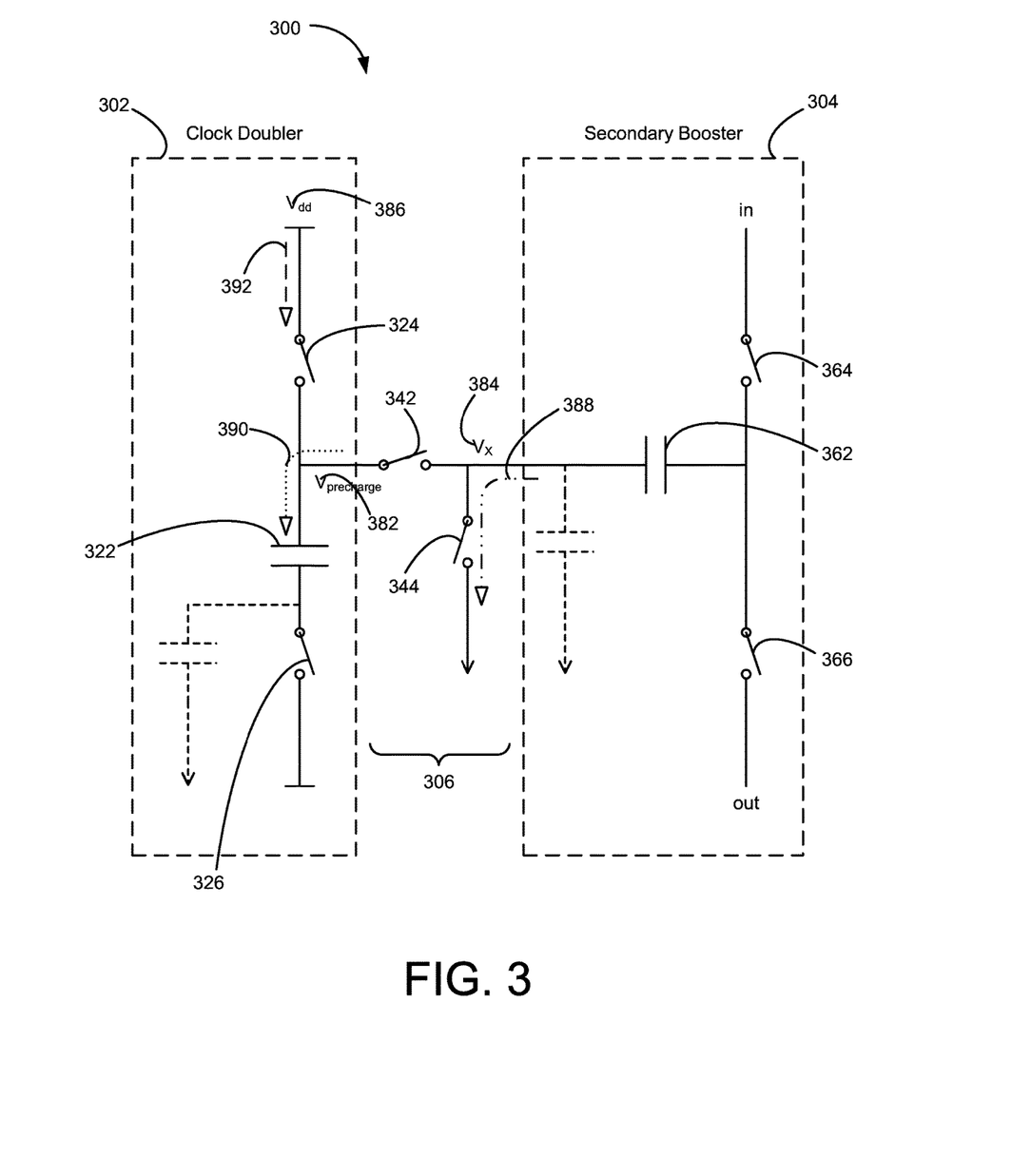
FIG. 3 is an example circuit diagram of an electronic device in accordance with an embodiment of the present technology.

FIG. 3 is an example circuit diagram of an electronic device 300 in accordance with an embodiment of the present technology. The electronic device 300 can include a clock doubler 302 (e.g., similar to the clock booster 204 of FIG. 2), a secondary booster 304 (e.g., similar to the secondary booster 206 of FIG. 2), and a switching module 306 (e.g., similar to the switching module 208 of FIG. 2).

In some embodiments, the clock doubler 302 can include a doubler capacitor 322 connected to a source switch 324 on one node and a doubler charging switch 326 on an opposite node. Opposite the doubler capacitor 322, the source switch 324 can be connected to a power source (e.g., for accessing an input voltage 386, represented as '$V_{dd}$') and the doubler charging switch 326 can be connected to a periodic signal used to generate the boosted intermediate voltage 210 of FIG. 2.

In some embodiments, the switching module 306 can include a connecting switch 342 for controlling an electrical connection between the clock doubler 302 and the secondary booster 304. When closed or turned on, the connecting switch 342 can connect the clock doubler 302 and the secondary booster 304 to provide the boosted output to the secondary booster 304. When open or turned off, the connecting switch 342 can electrically isolate the clock doubler 302 and the secondary booster 304.

The switching module 306 can further include a discharging switch 344 between the connecting switch 342 and the secondary booster 304 configured to discharge energy from the secondary booster 304 to ground. The discharging switch 344 can generally operate in a complementary manner to the connecting switch 342. For example, for the discharging operation, the discharging switch 344 (e.g., based on closing or turning on) can connect the secondary booster 304 to ground when the connecting switch 342 (e.g., based on opening or turning off) isolates the clock doubler 302 from the secondary booster 304. For the charging or boosting operation, the discharging switch 344 (e.g., based on opening or turning off) can isolate the secondary booster from ground when the connecting switch 342 (e.g., based on closing or turning on) connects the clock doubler 302 and the secondary booster 304.

Additionally, for discharging the secondary booster 304, the switching module 306 can operate to recycle at least part of the energy in the secondary booster 304 and send it to the clock doubler 302 instead of discharging all of the remaining charges to a lower potential node (e.g., electrical ground). The clock doubler 302 can use the remaining charges to precharge the doubler capacitor 322, which can improve overall efficiency based on reducing a charging duration required to charge the doubler capacitor 322 and/or demand on the power source (e.g., based on going from a positive voltage level to $V_{dd}$ instead of from zero volts). To recycle the charges, the connecting switch 342 can remain closed/on and the discharging switch 344 can remain open/off for a portion of the discharging operation.

The recycling process can utilize the remaining charges from a booster capacitor 362 in the secondary booster 304. The secondary booster 304 can use the booster capacitor 362 with an input switch 364 and an output switch 366 to further boost the boosted intermediate voltage 210 and/or the input voltage 386 during a charging operation (e.g., based on a rising edge of the periodic signal controlling the charging operation). For the discharging operation (e.g., based on a falling edge of the periodic signal), the charges stored on the booster capacitor 362 can be discharged or removed as discussed above.

For the recycling process, the charges from the booster capacitor 362 can contribute to or increase a precharging voltage 382 (e.g., represented as '$V_{precharge}$') at the doubler capacitor 322. Separately, the booster capacitor 362 can have an intermediate node voltage 384 (e.g., represented as '$V_x$') at a port or a node connected to the connecting switch 342. When the connecting switch 342 is closed (e.g., when the doubler capacitor 322 is discharged or at a lower potential than the intermediate node voltage 384), recycled charge 390 can go from the booster capacitor 362 to the doubler capacitor 322 (e.g., with the intermediate node voltage 384 matching the precharging voltage 382 ($V_x=V_{precharge}$) as a result). The intermediate node voltage 384 can decrease (e.g., by an amount corresponding to the recycled charge 390) based on a capacitance level of the doubler capacitor 322, the booster capacitor 362, or a combination thereof.

After recycling, the connecting switch 342 can open to isolate the clock doubler 302 from the secondary booster 304 (e.g., isolating the doubler capacitor 322 and the booster capacitor 362). The electronic device 300 can remove discharge loss 388 (e.g., charges that remain on the booster capacitor 362 after the recycling process) from the booster capacitor 362 based on closing the discharging switch 344.

Also after the recycling, the electronic device 300 can further increase the precharging voltage 382 using source-charging energy 392 from the input source to the doubler capacitor 322. The electronic device 300 can increase the precharging voltage 382 based on closing the source switch 324 and connecting the doubler capacitor 322 to the input voltage 386.

Figure 4:
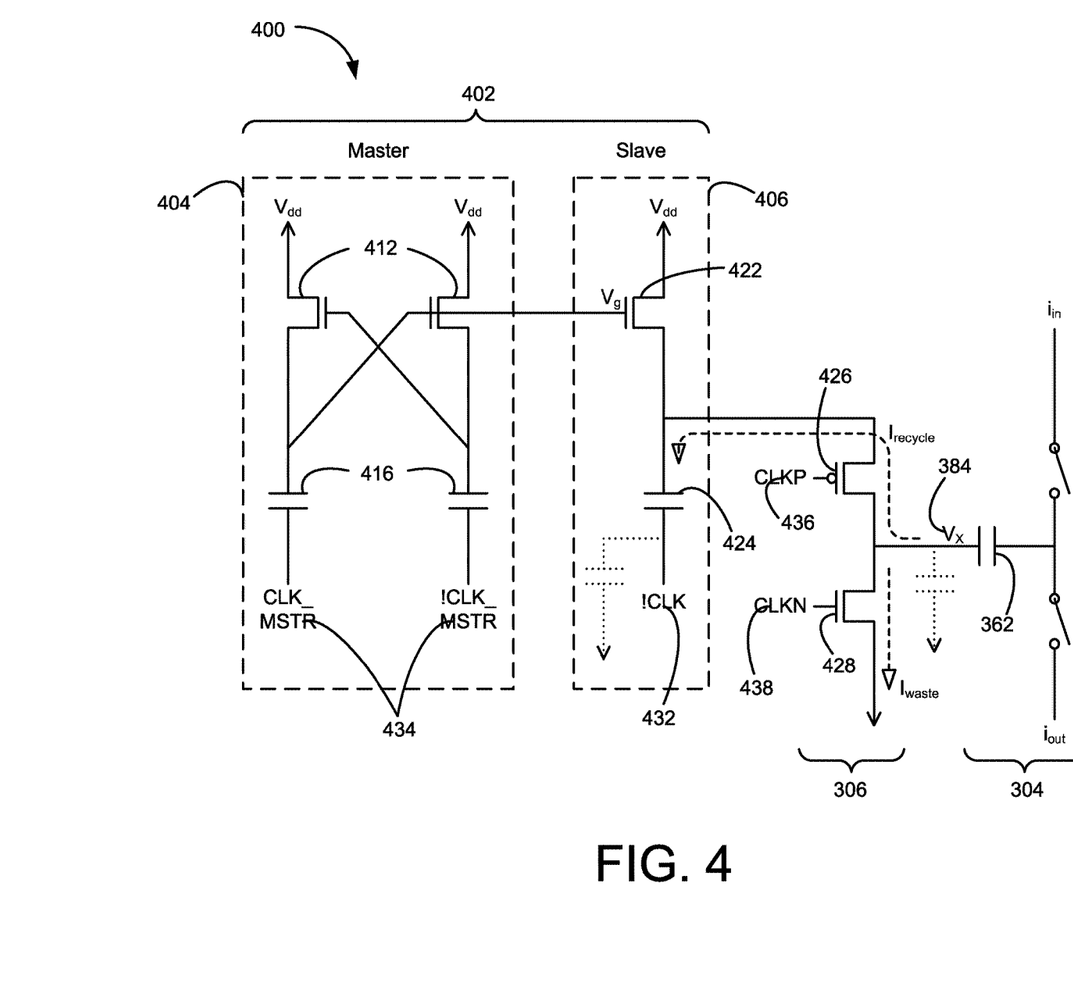
FIG. 4 is a further example circuit diagram of an electronic device in accordance with an embodiment of the present technology.

FIG. 4 is a further example circuit diagram of an electronic device 400 in accordance with an embodiment of the present technology. The electronic device 400 (e.g., double boosted charge pumps utilizing master-slave configuration) can include a clock booster 402 (e.g., similar to the clock doubler 302 of FIG. 3) having a master-controller 404 and a slave-booster 406. The master-controller 404 can be configured to operate the slave-booster 406 (e.g., for controlling the charging operation), and the slave-booster 406 can be configured to drive the load (e.g., the secondary booster 304). For example, the master-controller 404 can include one or more controller switches 412 (e.g., similar to the source switch 324 of FIG. 3 but for control operations instead of the charging/driving operation) connected to one or more controller capacitors 416 (e.g., similar to the doubler capacitor 322 of FIG. 3 but for control operations instead of the charging/driving operation). The controller capacitors 416 can be further connected to gates of the controller switches 412, and can operate based on clock master signals 434 (e.g., represented as 'CLK_MSTR' and '!CLK_MSTR' that represents an opposite or a complementary signal of CLK_MSTR).

The slave-booster 406 can include a driver switch 422 (e.g., similar to the source switch 324 but for the charging/driving operation instead of the control operations) connected to a driver capacitor 424 (e.g., similar to the doubler capacitor 322 but for the charging/driving operation instead of the control operations). For example, a gate of the driver switch 422 can be connected to one of the controller switches 412 and/or one of the controller capacitors 416. The driver capacitor 424 can be controlled based on clock signals 432 (e.g., represented as 'CLK' (not shown) or '!CLK' that represents an opposite or a complementary signal of 'CLK'). The driver capacitor 424 can further have greater capacitance than the controller capacitors 416 (e.g., based on a factor of 10 or more, such as for controlling based on the controller capacitors 416 and for driving the load based on the driver capacitor 424).

The slave-booster 406 can be connected to the secondary booster 304 through the switching module 306 of FIG. 3. For example, the slave-booster 406 can be directly connected to a module first switch 426 (e.g., the connecting switch 342 of FIG. 3, which can be implemented as a PMOS transistor, such as the first PMOS 222 of FIG. 2, the second PMOS 226 of FIG. 2, etc.) in the switching module 306. The module first switch 426 can connect the driver capacitor 424 to the booster capacitor 362 (e.g., for charging the intermediate node voltage 384 and/or recycling the charges on the booster capacitor 362 for the precharging process).

The switching module 306 can further include a module second switch 428 (e.g., the discharging switch 344 of FIG. 3, which can be implemented as an NMOS transistor, such as the first NMOS 224 of FIG. 2, the second NMOS 228 of FIG. 2, etc.) for discharging the intermediate node voltage 384. The module second switch 428 can connect the booster capacitor 362 to ground or a lower potential/voltage node. The switching module 306 can include the module first switch 426 and/or the module second switch 428 instead of a simple inverter.

The switching module 306 can operate the switches based on a module first signal 436, a module second signal 438, or a combination thereof. The module first signal 436 can operate the module first switch 426 and the module second signal 438 can operate the module second switch 428. For example, the module first signal 436 can connect the module first switch 426 (e.g., based on turn the switch on) for a charging/driving process (e.g., rising edge of one or more of the clock master signals 434 and/or the clock signals 432) and for the recycling process. The module second signal 438 can connect the module second switch 428 for a discharging process (e.g., after the recycling process).

For illustrative purposes, the electronic device is shown in FIG. 3 and FIG. 4 with one path/circuit set for the clock doubler 302 and the secondary booster 304. However, it is understood that the circuits can be mirrored (e.g., one set corresponding to one of the clock signals and/or one of the clock_master signals and the mirroring set corresponding to the other or complementary/negated form of the clock signal).

Also for illustrative purposes, non-ideal losses to ground (e.g., corresponding to capacitor implementations, such as residual substrate capacitances for CMOS implementations) for the boosting and/or clock-doubler capacitors have been shown as dotted lines representing capacitances to ground. The charge recycling operations discussed herein can compensate for the non-ideal losses in the clock-doubler capacitors and/or the secondary booster capacitors.

Figure 5:
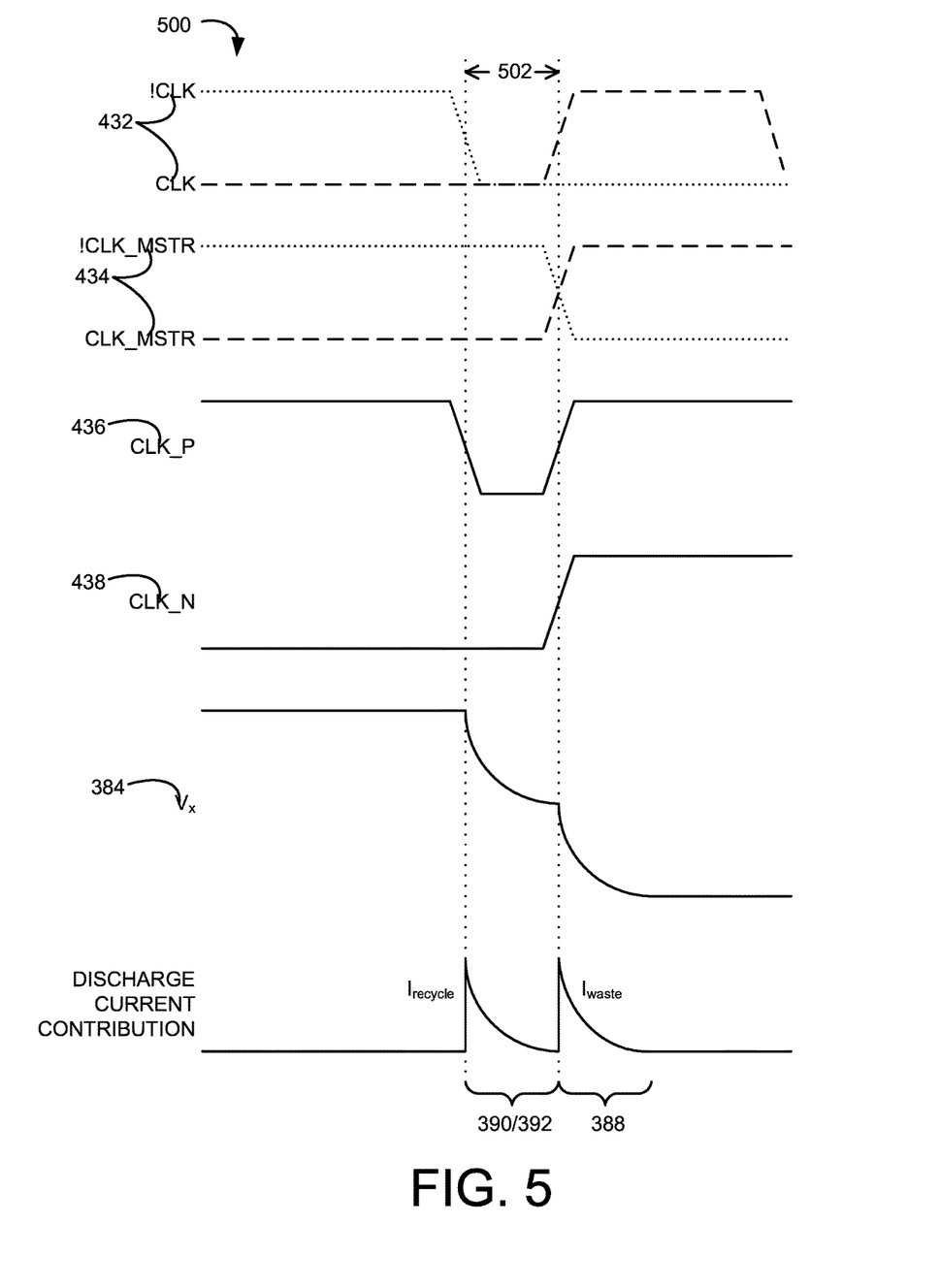
FIG. 5 is an example timing diagram for an electronic device in accordance with an embodiment of the present technology.

FIG. 5 is an example timing diagram 500 for an electronic device (e.g., the electronic device 200 of FIG. 2, the electronic device 300 of FIG. 3, the electronic device 400 of FIG. 4, etc.) in accordance with an embodiment of the present technology. The example timing diagram 500 can illustrate an example relationship (e.g., a temporal relationship) between input signals (e.g., the clock signals 432 such as the clock signal and the negated signal, the clock master signals 434 such as the clock master signal and the negated master signal, the module first signal 436 represented as 'CLK_P,' the module second signal 438 represented as 'CLK_N,' etc.) for the electronic device. The example timing diagram 500 can be for operating the clock doubler 302 of FIG. 3 (e.g., the master-controller 404 of FIG. 4 and/or the slave-booster 406 of FIG. 4 of the clock booster 402 of FIG. 4), the switching module 306 of FIG. 3, a portion thereof, or a combination thereof illustrated in FIG. 4.

The timing for input signals can be based on a recycling duration 502 (e.g., a duration for recycling the source-charging energy 392 and/or the recycled charge 390 from the booster capacitor 362 of FIG. 3 to the driver capacitor 424 of FIG. 4). In some embodiments, the recycling duration 502 can be a duration lasting 0.1 ns or more.

The input signals can keep or operate the connecting switch 342 of FIG. 3 (e.g., the module first switch 426 of FIG. 4) closed while the bottom plate of the driver capacitor 424 is pulled low and/or the bottom plate of the control capacitor controlling the driver switch 422 for the driver capacitor 424 is low (e.g., while the gate voltage for the driver switch 422 is also low). For example, the clock signals 432 (e.g., both the clock signal and the negated signal) can be low during the recycling duration 502 to pull the lower plate of the driver capacitors low. The clock master signals 434 (e.g., both the master clock signal and the negated master signal) can remain in their signal states during the recycling duration 502. The clock master signal that is for controlling the slave-booster 406 (or a portion thereof) can remain low during the recycling duration 502. In reference to FIG. 4 and FIG. 5, the CLK_MSTR signal (e.g., for controlling the driver switch 422 connected to the driver capacitor 424) can remain low during the recycling duration 502 while the clock signals 432 (e.g., both the CLK and !CLK) remain low. Accordingly, the gate voltage for the driver switch 422 (e.g., '$V_g$') can be low.

Also during the recycling duration 502, the module first signal 436 can be low (e.g., for PMOS, a negative pulse with a pulse width equal to the recycling duration 502) for connecting the module first switch 426 and discharging the intermediate node voltage 384 from the booster capacitor 362 to the driver capacitor 424. As such, the intermediate node voltage 384 can be reduced according to the recycled charge 390 and/or the source-charging energy 392 (e.g. from $2V_{dd}$ to $V_{dd}$).

After the recycling duration, the clock signals 432, the clock master signals 434, or a combination thereof can resume the periodic portions for operating/precharging the clock booster 402 of FIG. 4. Further, the module first signal 436 can return to high magnitude for turning off or opening the module first switch 426 (e.g., PMOS) and isolating the secondary booster 304 from the clock booster 402 after recycling the charges. The module second signal 438 can further go high magnitude for turning on or closing the module second switch 428 (e.g., NMOS) and connecting the booster capacitor 362 to ground. Accordingly, the remaining charges on the booster capacitor 362 can be discharged to ground (e.g., the discharge loss 388 corresponding to the intermediate node voltage 384 going from $V_{dd}$ to zero volts).

Recycling the recycled charge 390 from the booster capacitor 362 to the doubler capacitor 322 through the connecting switch 342 provides increased efficiency for charging capacitors. Based on the recycling, the device can begin charging the doubler capacitor 322 having the recycled charge 390 thereon instead of charging from zero voltage. Accordingly, recycling the recycled charge 390 instead of discharging to ground as the discharge loss 388 can reduce the source-charging energy 392 in comparison to charging from zero voltage.

Figure 6:
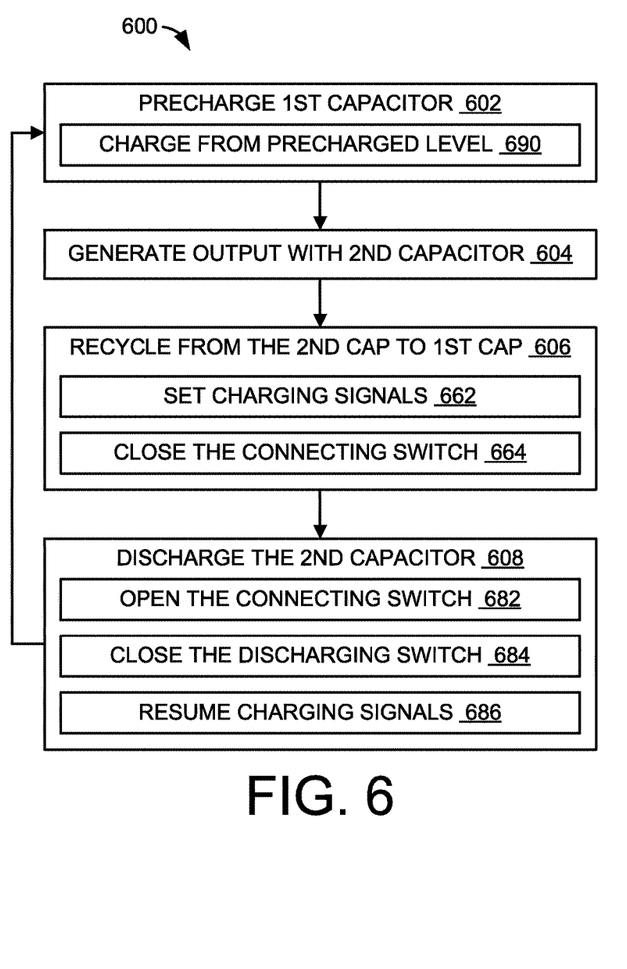
FIG. 6 is a flow diagram illustrating an example method of operating an electronic device in accordance with an embodiment of the present technology.

FIG. 6 is a flow diagram illustrating an example method 600 of operating an electronic device in accordance with an embodiment of the present technology. The method 600 can be for operating the electronic device 200 of FIG. 2, the electronic device 300 of FIG. 3, the electronic device 400 of FIG. 4, a portion therein, or a combination thereof.

At block 602, the electronic device (e.g., a charge pump, such as a double-boosted charge pump) can initiate (e.g., using the clock booster 204 of FIG. 2, the clock doubler 302 of FIG. 3, the clock booster 402 of FIG. 4, a state machine or a controller circuit, etc.) the charging operating based on precharging a first capacitor (e.g., the doubler capacitor 322 of FIG. 3, the driver capacitor 424 of FIG. 4, etc.). For precharging, the electronic device can charge the first capacitor to the boosted intermediate voltage 210 of FIG. 2, the precharging voltage 382 of FIG. 3, or a combination thereof that is greater than the input voltage 386 of FIG. 3 (e.g., $V_{precharge}$ equals or is within a predetermined range from $2V_{dd}$).

The electronic device can precharge based on charging signals (e.g., the clock signals 432 of FIG. 4, the clock master signals 434 of FIG. 4, etc.). For example, the clock doubler 302 and/or the slave-booster 406 of FIG. 4 can precharge based on the clock signals 432 (e.g., CLK and/or !CLK) connected to and/or charging a gate/plate of the first capacitor (e.g., during the rising edge and/or upper portion of the clock signals 432) opposite the supply for the input voltage 386 and/or the driver switch 422 of FIG. 4, the source switch 324 of FIG. 3, etc. Accordingly, the precharging operation can generate the boosted intermediate voltage 210, the precharging voltage 382, or a combination thereof at the first capacitor.

In some embodiments, the electronic device can precharge using the clock master signals 434 (e.g., CLK_MSTR and/or !CLK_MSTR). For example, the electronic device (e.g., for double-boosted charge pumps including master-slave configuration) can include the master-controller 404 of FIG. 4 (e.g., circuit configured to control charging operations of the connected slave circuit) and the slave-booster 406 of FIG. 4 (e.g., circuit, which includes the first capacitor, configured to supply voltage to the connected load). The master-controller 404 can operate and control the slave-booster 406 based on the clock master signals 434 (e.g., based on the clock master signals 434 driving a portion or a node of the controller capacitors 416 of FIG. 4 opposite the input voltage 386, the controller switches 412, or a combination thereof). The slave-booster 406 can precharge the first capacitor based on the clock signals 432. In some embodiments, the clock master signals 434 and the clock signals 432 can be non-overlapping signals (e.g., during the recycling duration 502 of FIG. 5).

At block 604, the electronic device can generate an output (e.g., the stage output voltage 214 of FIG. 2) with a second capacitor (e.g., the booster capacitor 362 of FIG. 3) electrically connected to the first capacitor. For example, the switching module 208 of FIG. 2 (e.g., such as the switching module 306 of FIG. 3) can connect the first capacitor to the second capacitor for generating the output. The boosted intermediate voltage 210 (e.g., the voltage level at the first capacitor resulting from the precharging operation) can be routed through (e.g., based on closing the connecting switch 342 of FIG. 3, the module first switch 426 of FIG. 4, or a combination thereof and/or opening the discharging switch 344 of FIG. 3, the module second switch 428 of FIG. 4, or a combination thereof) the switching module 208 for charging the booster capacitor 362 in the secondary booster 206 of FIG. 2 and/or the secondary booster 304 of FIG. 3 and generating the output.

At block 606, the electronic device can recycle charges from the second capacitor to charge the first capacitor. For example, after generating the output (e.g., charging the booster capacitor 362), the electronic device can recycle charges (e.g., during the recycling duration 502, during or prior to a falling edge and/or a lower portion of one or more charging signals, or a combination thereof) from the booster capacitor 362 to charge the doubler capacitor 322, the driver capacitor 424, or a combination thereof.

For recycling, at block 662, the electronic device can set, control, and/or drive the charging signals (e.g., the clock signals 432, the clock master signals 434, a portion or a segment thereof, or a combination thereof). For example, the electronic device (e.g., using a controlling circuit, a state machine, other circuits within the device, etc.) can set the clock signals 432 low (e.g., for preventing or delaying the precharging operation). The electronic device can set the clock signals 432 based on delaying a rising portion of the clock signals 432 (e.g., the CLK signal) after the corresponding complementary signals (e.g., the !CLK signal) goes low. The electronic device can use the clock signals 432 that are complementary, but not overlapping each other (e.g., during the recycling duration 502, which can occur every half cycle of the clock signals 432 where one of the clock signals 432 is low, the other of the clock signals 432 can also remain low).

In some embodiments, the electronic device can maintain the states or levels of the clock master signals 434 during the recycling duration 502. For example, as illustrated in FIG. 5, the !CLK_MSTR can remain high and CLK_MSTR can remain low during the recycling duration 502. Accordingly, the electronic device can control or use the clock master signals 434 that are non-overlapping or different from the clock signals 432 (e.g., the state or level transitions of the clock master signals 434 can be synchronized or contemporaneous with a rising transition of the clock signals 432 and not the falling transitions thereof).

Also for recycling, at block 664, the electronic device can operate switches for the switching module 208 and/or the switching module 306. The electronic device can operate the connecting switch 342, the module first switch 426, the discharging switch 344, the module second switch 428, or a combination thereof during the recycling duration 502 for the recycling operation. For example, the electronic device can control or set the module first signal 436 of FIG. 4 to close or connect the connecting switch 342, the module first switch 426, or a combination thereof during the recycling duration 502 to electrically connect the clock doubler and the secondary booster (e.g., based on directly connecting the first capacitor to the second capacitor). Also for example, the electronic device can control or set the module second signal 438 of FIG. 4 to open or disconnect (e.g., based on keeping the switches in the open/disconnected state as illustrated in FIG. 5) the discharging switch 344, the module second switch 428, or a combination thereof during the recycling duration 502 to electrically isolate the booster capacitor 362 from electrical ground or a voltage level lower than the intermediate node voltage.

Based on the charging signals and the switch operations, the recycled charge 390 can transfer or flow from the booster capacitor 362 to the doubler capacitor 322/the driver capacitor 424 through the connecting switch 342/the module first switch 426 during the recycling duration 502. Accordingly, the discharging/recycling of the recycled charge 390 can reduce the intermediate node voltage 384 of FIG. 3 at the booster capacitor 362 (e.g., reducing from a voltage level that resulted from charging the booster capacitor before the recycling duration 502). For example, the intermediate node voltage 384 can go from $2V_{dd}$ to $V_{dd}$, and the corresponding recycled charge can charge the doubler capacitor 322/the driver capacitor 424 to $V_{dd}$ (e.g., for matching capacitance levels between the connected capacitors) or a different voltage that corresponds to a difference in capacitance level between the connected capacitors.

At block 608, the electronic device can discharge the second capacitor and removed the charges remaining after the recycling duration 502. At the end of the recycling duration 502, the electronic device can operate the switches, control the charging signals, or a combination thereof to discharge the intermediate node voltage 384 remaining after discharging/recycling the recycled charge 390.

At block 682, the electronic device can open or disconnect the connecting switch 342/the module first switch 426 at the end of the recycling duration 502 for the discharging operation. For example, the electronic device can set or control the module first signal 436 or a corresponding signal to open or disconnect the connecting switch 342/the module first switch 426, thereby isolating the second capacitor from the first capacitor.

At block 684, the electronic device can close or connect the discharging switch 344/the module second switch 428 for the discharging operation. For example, at the end of the recycling duration 502 and/or after or contemporaneous with block 682, the electronic device can set or control the module second signal 438 or a corresponding signal to close or connect the discharging switch 344/the module second switch 428, thereby connecting the second capacitor to the electrical ground or the lower voltage level.

At block 686, the electronic device can control or set the charging signals. For example, the electronic device can set or drive one of the clock signals 432 (e.g., the signal complementary to the one that went low immediately before the recycling duration 502) low after or at the end of the recycling duration 502. Also for example, the electronic device can set or drive the clock master signals 434 to change states (e.g., transitioning from high to low or from low to high) after or at the end of the recycling duration 502.

The electronic device can discharge the intermediate node voltage 384 at the booster capacitor 362 (e.g., charges remaining after discharging/recycling the recycled charge 390) based on the charging signals and/or the switch settings. Further, the electronic device can begin the precharging process for charging the first capacitor after the recycling duration 502. Accordingly, the precharging process can charge the first capacitor having the recycled charge 390 thereon instead of from zero volt potential. As a result, the recycling operation can increase the efficiency of the overall charging operation by decreasing the source-charging energy 392 of FIG. 3 that is necessary to precharge the first capacitor.

Figure 7:
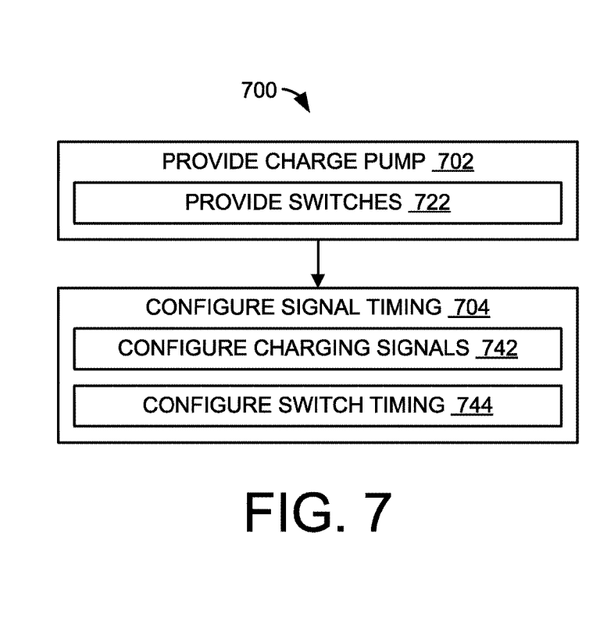
FIG. 7 is a flow diagram illustrating an example method of manufacturing an electronic device in accordance with an embodiment of the present technology.

FIG. 7 is a flow diagram illustrating an example method 700 of manufacturing an electronic device in accordance with an embodiment of the present technology. The method 700 can be for manufacturing the electronic device 200 of FIG. 2, the electronic device 300 of FIG. 3, the electronic device 400 of FIG. 4, a portion therein, or a combination thereof.

At block 702, circuit for the charge pump (e.g., the electronic device 200 of FIG. 2, the electronic device 300 of FIG. 3, the electronic device 400 of FIG. 4, a portion therein, or a combination thereof) can be provided. Providing the circuit can include forming the circuit (e.g., on a silicon wafer based on wafer-level processes), connecting or assembling circuitry components, or a combination thereof.

At block 722, providing the circuit can further include providing switches, such as the connecting switch 342 of FIG. 3 (e.g., the module first switch 426 of FIG. 4), the discharging switch 344 of FIG. 3 (e.g., the module second switch 428 of FIG. 4), or a combination thereof. The connecting switch 342 can be directly connected to the clock doubler/booster (e.g., the first capacitor therein) on one side/node and directly connected to the secondary booster on the opposite side/node of the booster capacitor 362.

At block 704, the circuit can be configured for signal timings. For example, the circuit can be connected or manufactured (e.g., based on silicon-level processing or connecting circuit components) to implement the signal timings (e.g., as illustrated in FIG. 5). Also for example, firmware or software can be loaded for implementing the signal timings with the circuit.

At block 742, configuring the circuit can include configuring the charging signals. For example, the state machine or the controller circuit can be configured or the firmware/software can be loaded for controlling the clock signals 432 of FIG. 4, the clock master signals 434 of FIG. 4, or a combination thereof. Also for example, the circuit can be provided with circuits for generating periodic signals (e.g., for clock-type signals) for implementing the clock signals 432, the clock master signals 434, or a combination thereof. The charging signals can be configured relative to or for implementing the recycling duration 502 of FIG. 5 (e.g., for keeping the clock signals 432 low and/or maintaining the clock master signals 434 during the recycling duration 502 following immediately after a falling edge of the clock signals 432).

At block 744, configuring the circuit can include configuring the switch timing. For example, the state machine or the controller circuit can be configured or the firmware/software can be loaded for controlling the module first signal 436 of FIG. 4, the module second signal 438 of FIG. 4, or a combination thereof. The module first signal 436 can be configured to connect or close the module first switch 426 of FIG. 4 or the connecting switch 342 of FIG. 3 during the recycling duration 502. The module second signal 438 can be configured to close or connect the module second switch 428 of FIG. 4 or the discharging switch 344 of FIG. 3 after the recycling duration 502 and/or during a low portion/cycle of the corresponding one of the clock signals 432, the corresponding one of the clock master signals 434, or a combination thereof.

Figure 8:
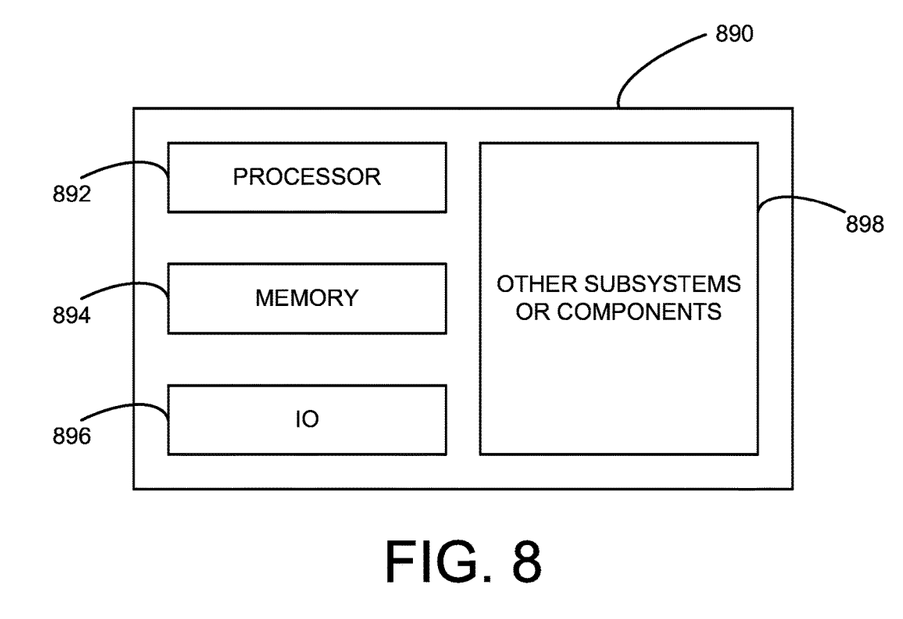
FIG. 8 is a schematic view of a system that includes an electronic device in accordance with embodiments of the present technology.

FIG. 8 is a schematic view of a system that includes an electronic device in accordance with embodiments of the present technology. Any one of the semiconductor devices having the features described above with reference to FIGS. 1-7 can be incorporated into any of a myriad of larger and/or more complex systems, a representative example of which is system 890 shown schematically in FIG. 8. The system 890 can include a processor 892, a memory 894 (e.g., SRAM, DRAM, flash, and/or other memory devices), input/output devices 896, and/or other subsystems or components 898. The semiconductor assemblies, devices, and device packages described above with reference to FIGS. 1-7 can be included in any of the elements shown in FIG. 8. The resulting system 890 can be configured to perform any of a wide variety of suitable computing, processing, storage, sensing, imaging, and/or other functions. Accordingly, representative examples of the system 890 include, without limitation, computers and/or other data processors, such as desktop computers, laptop computers, Internet appliances, hand-held devices (e.g., palm-top computers, wearable computers, cellular or mobile phones, personal digital assistants, music players, etc.), tablets, multi-processor systems, processor-based or programmable consumer electronics, network computers, and minicomputers. Additional representative examples of the system 890 include lights, cameras, vehicles, etc. With regard to these and other examples, the system 890 can be housed in a single unit or distributed over multiple interconnected units, e.g., through a communication network. The components of the system 890 can accordingly include local and/or remote memory storage devices and any of a wide variety of suitable computer-readable media.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

I claim:

1. An electronic device, comprising:
a clock booster circuit including a first doubler capacitor and a second doubler capacitor, the clock booster circuit configured to precharge the first and second doubler capacitors to each store a boosted intermediate voltage greater than an input voltage, wherein the first doubler capacitor is connected to a first clock signal and the second doubler capacitor is connected to a second clock signal;
a secondary booster circuit including a first booster capacitor coupled to the first doubler capacitor and a second booster capacitor coupled to the second doubler capacitor, the secondary booster circuit configured to use charges stored on the first and second doubler capacitors to generate one or more stage outputs greater than the boosted intermediate voltage; and
a first connecting switch and a second connecting switch connected to the clock booster circuit and the secondary booster circuit, the first and second connecting switches configured to electrically connect the first and second doubler capacitors to the first and second booster capacitors, respectively, during recycling durations for discharging recycled charges from the first and second booster capacitor to the corresponding doubler capacitors through the first and second connecting switches, wherein the recycling duration occurs after generating the stage output;
wherein the first and second clock signals are both low during the recycling duration.

2. The electronic device of claim 1, wherein:
the first connecting switch is directly connected to the first doubler capacitor on one side and directly connected to the first booster capacitor on an opposing side; and
the second connecting switch is directly connected to the second doubler capacitor on one side and directly connected to the second booster capacitor on an opposing side.

3. The electronic device of claim 1, further comprising first and second discharging switches connected to the secondary booster circuit and configured to discharge from the first and second booster capacitors charges remaining after the recycling durations.

4. The electronic device of claim 3, wherein the first and second connecting switches and the first and second discharging switches are between the clock booster circuit and the secondary booster circuit without an inverter between the clock booster circuit and the secondary booster circuit.

5. The electronic device of claim 3, wherein the first and second connecting switches are complementary to the first and second discharging switches.

6. The electronic device of claim 5, wherein the first and second connecting switches include either PMOS transistors or NMOS transistors, and the first and second discharging switches include either the PMOS transistors or the NMOS transistors complementary to the first and second connecting switches.

7. The electronic device of claim 1, wherein the clock booster circuit includes:
a first slave booster including the first doubler capacitor a second slave booster including the second doubler capacitor, the first and second slave boosters configured to provide charges for the secondary booster circuit; and
a master-controller directly connected to the first and second slave boosters, configured to control operations of the first and second slave-boosters without directly providing charges to the secondary booster circuit.

8. The electronic device of claim 7, wherein:
each of the first and second doubler capacitors is connected to one of clock signals opposite the corresponding connecting switch; and
the master-controller includes first and second controller capacitors that are each connected to one of the first and second slave boosters on one side and one of clock master signals on an opposite side.

9. The electronic device of claim 8, further comprising a control circuit configured to:
set the first and second clock signals low during the recycling durations;
maintain the clock master signals at preceding states during the recycling durations; and
activate the first and second connecting switch during the recycling durations.

10. The electronic device of claim 1, wherein the secondary booster circuit is a Favrat booster.

11. A method of operating an electronic device including a clock doubler circuit including at least two doubler capacitors and a secondary booster circuit, comprising:
setting a first clock signal and a second clock signal both to a low state during a recycling duration, wherein the first and second clock signals are each configured to charge a corresponding doubler capacitor within the clock doubler circuit;
closing a connecting switch to electrically connect the clock doubler circuit to the secondary booster circuit during the recycling duration; and
discharging a recycled charge from the secondary booster circuit to one or more of the at least two doubler capacitors through the connecting switch during the recycling duration;
wherein the first and second clock signals are set low during the recycling duration.

12. The method of claim 11, further comprising:
charging a booster capacitor in the secondary booster based on charges on the one or more of the at least two doubler capacitors; and
wherein:
discharging the recycled charge includes discharging the recycled charge resulting from charging the booster capacitor before the recycling duration.

13. The method of claim 12, wherein charging the booster capacitor includes precharging the one or more of the at least two doubler capacitors with the clock doubler circuit based on the first and/or the second clock signals.

14. The method of claim 11, wherein:
discharging the recycled charge includes reducing an intermediate node voltage at a booster capacitor in the secondary booster circuit; and
further comprising:
discharging the intermediate node voltage that is remaining after discharging the recycled charge, wherein discharging the intermediate node voltage occurs after the recycling duration.

15. The method of claim 14, wherein:
discharging the recycled charge includes keeping a discharging switch open during the recycling duration for isolating the booster capacitor from a voltage level lower than the intermediate node voltage;
discharging the intermediate node voltage includes:
opening the connecting switch to isolate the at least two doubler capacitors from the booster capacitor; and
closing the discharging switch to connect the booster capacitor to the electrical ground or the lower voltage level.

16. The method of claim 11, further comprising opening the connecting switch at an end of the recycling duration.

17. The method of claim 11, further comprising precharging the one or more of the at least two doubler capacitors after the recycling duration, wherein precharging includes charging the one or more of the at least two doubler capacitor having the recycled charge thereon instead of charging from zero volt potential.

18. The method of claim 17, wherein precharging the one or more of the at least two doubler capacitor includes precharging the corresponding one or more doubler capacitors included in a slave booster of the clock doubler circuit, wherein the clock doubler circuit includes:
a master-controller circuit configured to control operations of the slave booster; and
the slave booster configured to charge the at least two doubler capacitors.

19. The method of claim 18, wherein precharging includes precharging based on the first and second clock signals at the slave booster, wherein the second clock signal is complementary to the first clock signal outside of the recycling duration.

20. The method of claim 18, wherein:
precharging includes precharging based on a clock master signal and a negated master signal at the master-controller circuit; and
further comprising:
maintaining states of the clock master signal and the negated master signal during the recycling duration.

21. A method of operating a charge pump, comprising:
precharging a first doubler capacitor a second doubler capacitor to store boosted intermediate voltages, wherein the first and second doubler capacitors are precharged using a first clock signal and a second clock signal, respectively;
generating first and second stage outputs at corresponding first and second booster capacitors based on the boosted intermediate voltages;
discharging recycled charges from the first and second booster capacitors to the corresponding first and second doubler capacitors after generating the stage output voltage, wherein:
the recycled charges are stored on the first and second doubler capacitors, and discharging the recycled charges includes driving the first and second clock signals low; and
discharging a discharge loss from the one or more booster capacitors to electrical ground after discharging the recycled charge.

22. The method of claim 21, wherein:
discharging the recycled charge includes:
closing a connecting switch during a recycling duration, wherein the connecting switch directly connects one of the doubler capacitors to corresponding one of the booster capacitors, and opening or keeping open a discharging switch during the recycling duration, wherein the discharging switch directly connects the one of the booster capacitors to electrical ground; and discharging the discharge loss includes:

opening the connecting switch after the recycling duration, and closing the discharging switch after discharging the discharge loss to the electrical ground.

23. The method of claim 22, wherein:

the first and second clock signals are driven low during the recycling duration; and the second clock signal complements the first clock signal outside of the recycling duration.

24. The method of claim 22, wherein:

precharging the doubler capacitor includes:

charging one of the doubler capacitors included in a slave-booster, and controlling charging of the first and second doubler capacitors using a master-controller that operates based on a clock master signal, a negated master signal, or a combination thereof; and discharging the recycled charge includes maintaining the clock master signal, the negated master signal, or a combination thereof during the recycling duration.

25. The method of claim 21, wherein precharging includes precharging the first and/or the doubler capacitors after a recycling duration with the first and/or the second doubler capacitors having the recycled charge thereon.

* * * * *